(No Model.)
J. WINKELMEYER.
MACHINE FOR CUTTING CLAY, &c.
No. 559,556.
3 Sheets—Sheet 2.
Patented May 5, 1896.
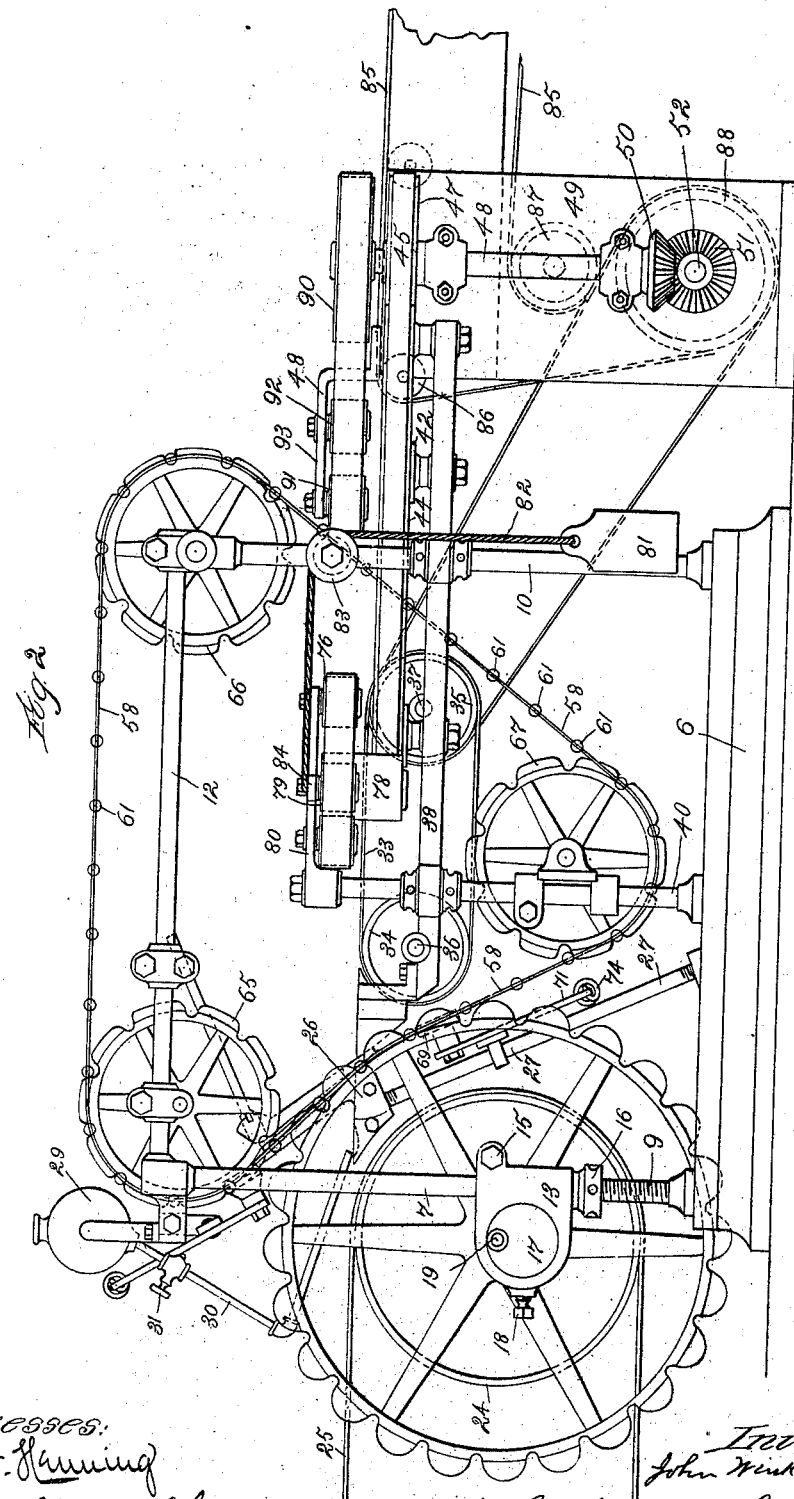

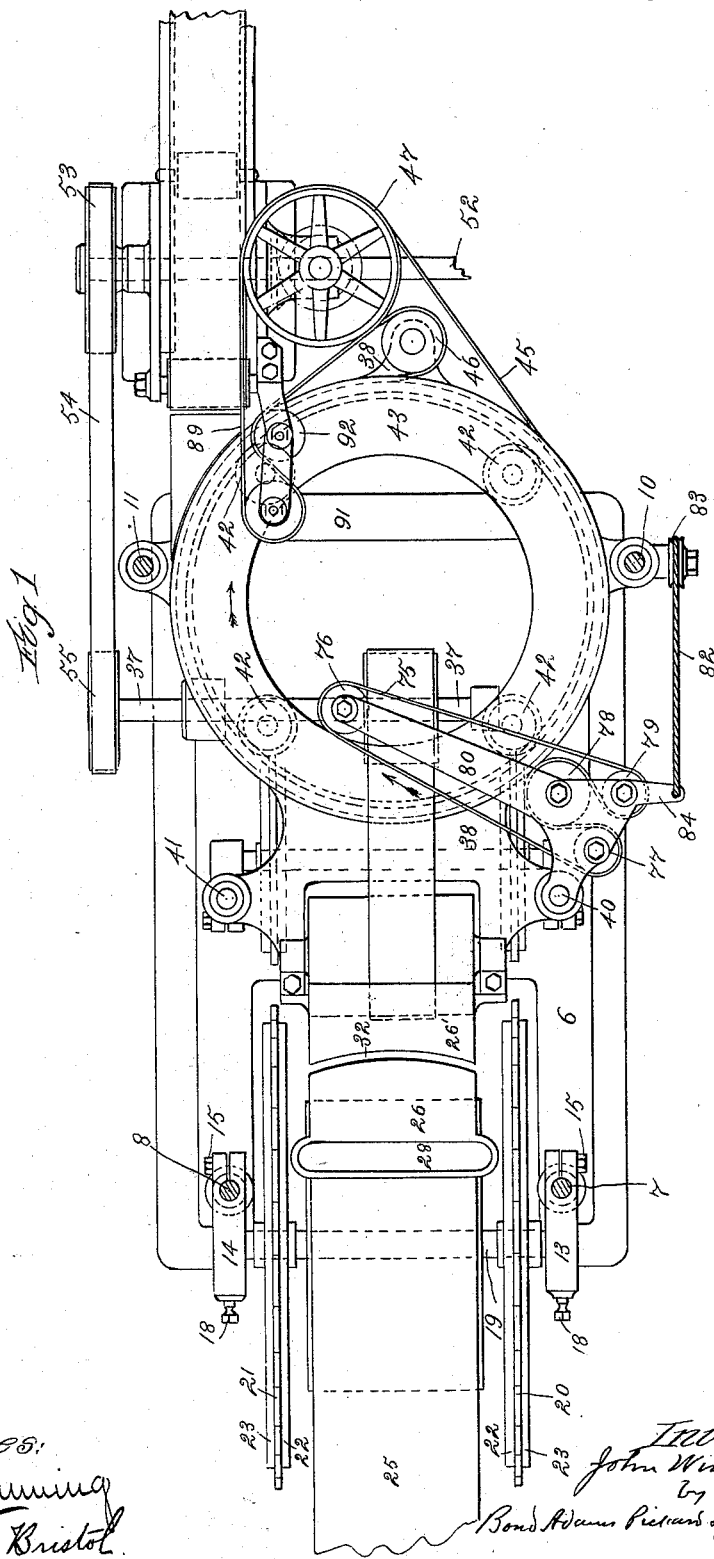

(No Model.) 3 Sheets—Sheet 3.
J. WINKELMEYER.
MACHINE FOR CUTTING CLAY, &c.
No. 559,556. Patented May 5, 1896.
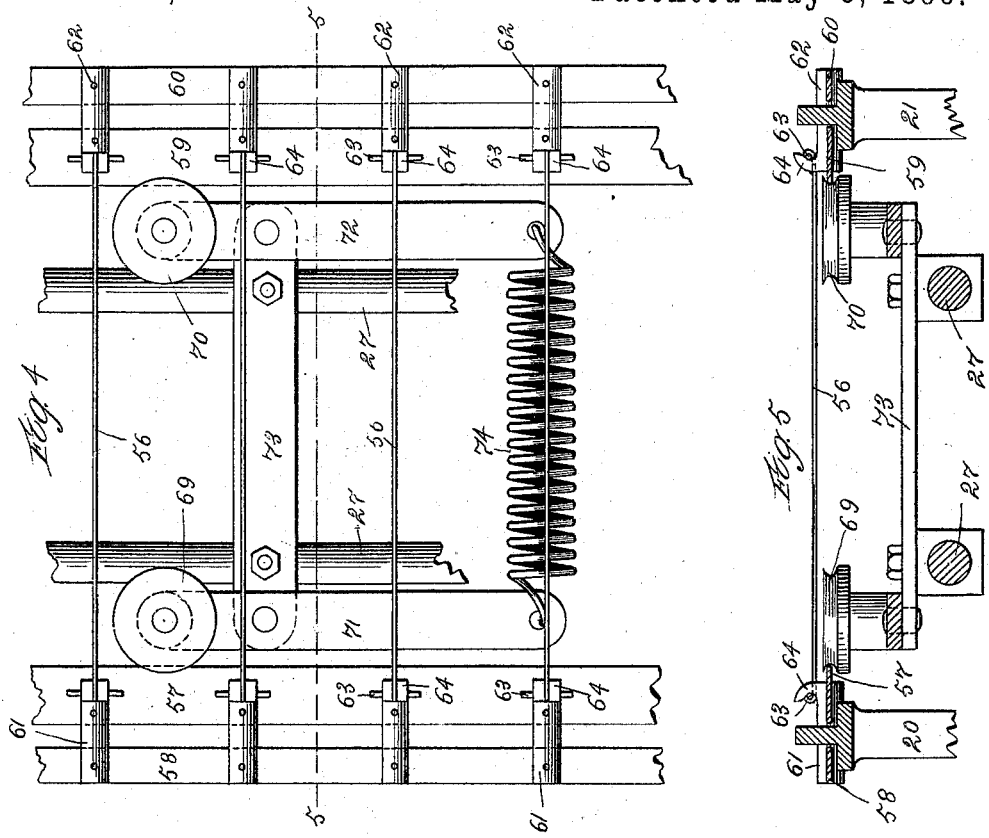
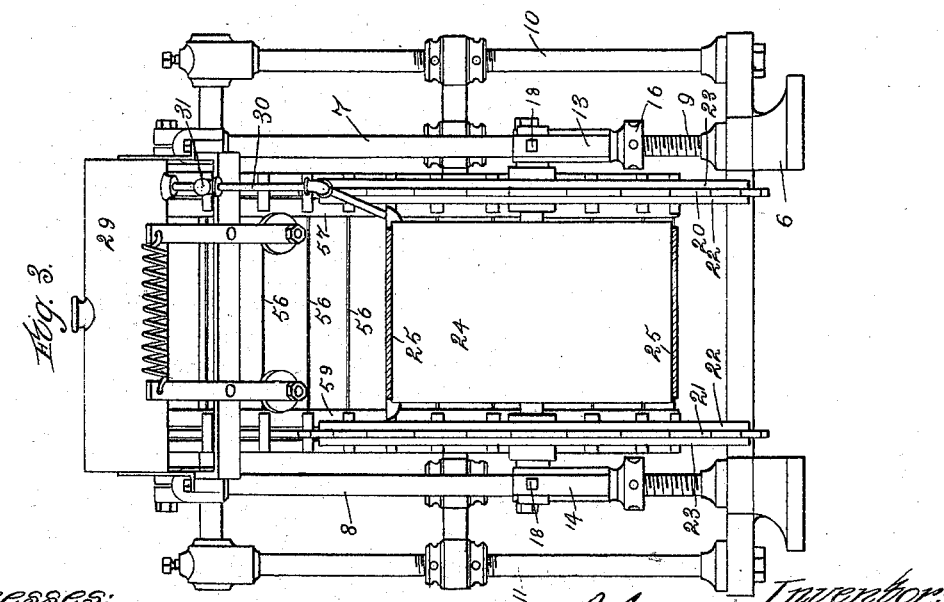
Witnesses: Inventor:

UNITED STATES PATENT OFFICE.

JOHN WINKELMEYER, OF FRANKFORT, INDIANA.

MACHINE FOR CUTTING CLAY, &c.

SPECIFICATION forming part of Letters Patent No. 559,556, dated May 5, 1896.

Application filed February 21, 1895. Serial No. 539,170. (No model.)

*To all whom it may concern:*

Be it known that I, JOHN WINKELMEYER, a citizen of the United States, residing at Frankfort, in the county of Clinton and State of Indiana, have invented certain new and useful Improvements in Machines for Cutting Clay and other Plastic Products, of which the following is a specification, reference being had to the accompanying drawings, in which—

Figure 1 is a plan view. Fig. 2 is a side elevation. Fig. 3 is an end view of the parts shown in Fig. 2, looking to the right. Fig. 4 is an enlarged detail showing the devices for keeping the wires taut. Fig. 5 is a section on line 5 5 of Fig. 4.

My invention relates to mechanism for cutting clay or other plastic products as they issue from the machine, and has especially to do with the manufacture of brick by cutting up a bar of clay issuing from a suitable machine. In the manufacture of brick by such method great difficulty has heretofore been experienced in producing satisfactory cutting devices, owing to the fact that the clay is constantly in motion, and it is necessary in order to produce a vertical cut that the cutting device move with the bar of clay during the process of cutting. To produce a cutting device which will operate satisfactorily to cut up such a bar of clay is one of the objects of my present invention.

Other objects of my invention are to provide means for adjusting the various parts of the cutting mechanism so that they may be adapted to the production of brick or other products of various sizes and to provide improved mechanism for handling the brick or other products after they are severed from the bar of clay.

I accomplish the objects of my invention as hereinafter specified and as illustrated in the drawings.

That which I regard as new will be set forth in the claims.

In the drawings, 6 indicates a base-plate, which is adapted to support certain parts of the mechanism.

7 8 indicate standards, which rise on opposite sides of the base-plate 6 near one end thereof, as shown in Figs. 1 and 2. The lower portions of the standards 7 8 are provided with screw-threads 9, as shown in Fig. 2. Rising from the opposite end of the baseplate 6 are standards 10 11, which are connected to the upper ends of the standards 7 8 by longitudinal bars 12, as shown in Fig. 2.

13 14 indicate brackets, which are mounted upon the standards 7 8, respectively, and are adapted to be clamped thereon by binding-screws 15, as shown in Figs. 1 and 2. The brackets 13 14 are further supported by nuts 16, adapted to move upon the screw-threads 9 of the standards 7 8, the arrangement being such that by loosening the binding-screws 15 and operating the nuts 16 the brackets 13 14 may be raised or lowered, as desired. As best shown in Fig. 2, the brackets 13 14 have circular bearings, in which are fitted bearing-blocks 17, adapted to rotate in the bearings. Binding-screws 18 are provided for locking the blocks 17 in a stationary position, when desired.

19 indicates a shaft, which is eccentrically mounted in a horizontal position in the bearing-blocks 17 of the two brackets 13 14, as shown in Fig. 2.

20 21 indicate sprocket-wheels, which are mounted upon the shaft 19 near its ends, as shown in Fig. 1. The sprocket-wheels 20 21 have their sprockets arranged centrally of the peripheries of said wheels, so that flanges 22 23 are provided at opposite sides of the sprockets, as shown in Fig. 1.

24 indicates a pulley, which is mounted upon the shaft 19 and is keyed thereto, the sprocket-wheels 20 21 being also keyed to said shaft.

25 indicates a belt, which passes around the pulley 24, as shown in Fig. 2. The belt 25 extends to the machine, from which issues the bar of clay, and serves to carry the bar of clay from such machine to the cutting mechanism. The belt 25 is driven by the movement of the bar of clay upon it, no other devices for driving said belt being employed.

26 indicates a table, which is supported by rods 27, rising from the base-plate 6, which table 26 is substantially upon a level with the upper portion of the belt 25 and serves to receive the forward end of the bar of clay after it passes from said belt. The height of the table 26 may be adjusted by turning the rods 27 as they are screwed into the table 26 and the base-plate 6. The distance of the sprocket-wheels 20 21 and the pulley 24 from the clay-forming machine, as well as their height, may be adjusted by turning the bearing-blocks 17 in their bearings, thereby throwing the shaft 19 toward or from such machine, as may be desired. The table 26 is provided with a recess 28, which is adapted to contain oil to lubricate the under side of the bar of clay and cause it to move very easily over the table and the other parts of the machine. The recess 28 receives a supply of oil from a tank 29, supported by standards 7 8, and communicating with the recess 28 by a tube 30, having a valve 31, as shown in Fig. 2. As shown in Fig. 1, the table 26 is divided into two parts, the inner portion being designated 26', there being between the two parts of the table a curved passage 32, the object of which will be hereinafter set forth. The inner portion 26' of the table receives the brick after they are severed from the bar of clay.

33 indicates an endless belt arranged around pulleys 34 35, mounted upon shafts 36 37, respectively, which shafts are supported by a horizontal plate 38, mounted upon standards 40 41 and the standards 10 11. The rear portion of the plate 38 is annular in form and carries upon vertical axes a series of rollers 42, upon which is mounted a turn-table 43, as shown in Fig. 1, which by this construction is adapted to rotate in a horizontal plane. The turn-table 43 is provided with a depending peripheral flange 44, adapted to receive a belt 45, which passes around said flange and thence over a guide-pulley 46, mounted upon a vertical pivot supported by an ear projecting from the plate 38 to a pulley 47, which is mounted upon a vertical shaft 48, said shaft being supported by a standard 49, as shown in Figs. 1 and 2. The shaft 48 carries on its lower end a bevel-pinion 50, which meshes with a bevel-pinion 51, mounted on a horizontal shaft 52, which is driven by suitable mechanism. A pulley 53 is mounted on an extension of the shaft 52, and by means of a belt 54 drives a pulley 55, mounted on an extension of the shaft 37, so that the belt 33 is driven from the shaft 52.

The bar of clay is cut up into bricks by wires 56, carried by belts 57 58 59 60, one end of each of said wires being connected to rods 61, secured to the belts 57 58, the other end of each of said wires being connected to similar rods 62, secured to the belts 59 60, as shown in Fig. 4. For securing the wires 56 to the rods 61 62 said wires are provided at their ends with cross-pins 63, and the rods 61 62 are provided with slotted hooks 64, so that by passing the wires through said slots they may be connected to the rods 61 62 by the pins 63, as shown in Fig. 4. The belts 57 58 59 60 are mounted in triangular form upon three pairs of sprocket-wheels 65 66 67, each of which is similar in general construction to the sprocket-wheels 20 21. As shown in Fig. 2, the sprocket-wheels 65 are mounted upon standards 7 8 above the sprocket-wheels 20 21, the sprocket-wheels 66 being mounted on the standards 10 11, and the sprocket-wheels 67 being secured upon the standards 40 41. As best shown in Fig. 2, the sprocket-wheels 67 are adjustably secured upon the standards 40 41, so that they may be adjusted vertically for the purpose of regulating the tension of the belts 57 58 59 60.

The arrangement of the sprocket-wheels 65 67 is such that the belts 57 58 59 60 will be caused to engage the sprockets of the wheels 20 21, the sprockets of the wheel 20 passing between the belts 57 58 and those of the wheel 21 passing between the belts 59 60, the rods 61 62 resting in the spaces between the sprockets of said wheels. The cutting-belt is driven from the sprocket-wheels 20 21, as it is evident that as said sprocket-wheels rotate the cutting-belt will be moved with such wheels, owing to the engagement of the rods 61 62 with such wheels. By this arrangement, therefore, as the bar of clay moves toward the cutting-belt the cutting-wires will be moved forward and downward at the same rate of speed as the bar of clay, and it will therefore be severed vertically.

During the operation of cutting the cutting-wires will be caused to yield at the center, as it is impossible to stretch them sufficiently to prevent it, and as the ends of the cutting-wire will consequently cut through the clay first the central portion of the cutting-wire will be carried forward slightly, owing to the movement of the bar of clay, and the cutting-wire will therefore be slightly curved to correspond, substantially, with the slot 32 at the time the bar of clay has been completely severed. The curved passage 32 is therefore provided in order to correspond to the curvature of the wires and thereby prevent breakage or mutilation of the bar of clay.

The wires are kept taut by means of rollers 69 70, carried by levers 71 72, respectively, pivoted to the ends of the cross-bar 73, as shown in Fig. 4, said cross-bar being supported by any suitable supporting device. The ends of the levers 71 72 are connected by a spring 74, the tension of which serves to force the rollers 69 70 apart. The cross-bar 73 is so located that the wires 69 70 will bear against the inner edges of the belts 57 59, and consequently said belts will be forced apart, stretching the wires 56. I have shown one set of rollers 69 70 as being secured to the bars 27, which carry the table 26, and also one set above the sprocket-wheels 20 21, such tension device being supported by the standards 7 8.

The bricks after being severed from the bar of clay rest upon the portion 26' of the table 26, and are thence pushed forward by the progress of the bar of clay until they are delivered upon the belt 33. They are then carried by said belt to the turn-table 43, upon which they are delivered by a belt 75, mounted upon pulleys 76 77 78 79, carried by a supporting-plate 80, pivoted upon the upper end of the standard 40, as shown in Figs. 1 and 2. The belt 75 is driven from the turn-table 43 by means of the pulley 78, which extends downward and frictionally engages the belt 45 upon the flange 44 of the turn-table, so that the motion of the turn-table 43 will be communicated to the belt 75. Consequently said turn-table and belt will both move in the direction indicated by the arrows in Fig. 1. The belt 75 is held in proper position by means of a weight 81 and cord 82, which cord passes over a pulley 83 and is connected to an arm 84, projecting from the plate 80, as shown in Figs. 1 and 2. As the bricks are carried by the belt 33 over the turn-table 43 they will be engaged by the belt 75 and deflected laterally upon the turn-table, by which they will be carried around to an off-carrying belt 85, which passes around pulleys 86 87 88, as shown in Fig. 2. The pulley 88 is mounted upon the shaft 52, and consequently the rotation of said shaft drives the off-carrying-belt. The bricks are deflected from the turn-table 43 upon the off-carrying belt by a belt 89, which passes around a pulley 90, mounted upon the upper end of the shaft 48, and around pulleys 91 92, carried by a bracket 93, secured to the standard 49, as shown in Figs. 1 and 2. The belt 89 is therefore also driven by the shaft 52.

That which I claim as my invention, and desire to secure by Letters Patent, is—

1. The combination with clay-carrying mechanism and endless belts, of cutting-wires secured to and carried by said belts, and mechanism for actuating said belts to cause the wires to move downward to cut the clay and operating at the same time to move said wires forward at the same rate of speed with the moving clay whereby the clay will be cut vertically, substantially as described.

2. The combination with a clay-carrying device, of sprocket-wheels at each side of said carrying device, said clay-carrying device being located in substantially a horizontal plane passing through the upper forward part of said sprocket-wheels, and belts arranged opposite said sprocket-wheels and carrying cutting-wires for vertically severing the clay, said belts being driven and guided by said sprocket-wheels, substantially as and for the purpose specified.

3. The combination with a clay-carrying belt, and a sprocket-wheel mounted at each side of said belt and rotating at a uniform rate of speed therewith, of belts operated by said sprocket-wheels, and cutting-wires connecting said sprocket-belts, substantially as described.

4. The combination with clay-carrying devices and cutting mechanism, of a turn-table, mechanism for automatically rotating said turn-table, an off carrying belt, and inclined belts for causing the delivery of bricks upon and from the turn-table, substantially as described.

5. The combination with clay-carrying mechanism, of a cutting-wire, belts to which said wire is rigidly secured, mechanism for moving said wire downward to cut the clay and for moving said wire forward at the same rate of speed as the clay, whereby the clay will be cut vertically, and a table having a curved passage for said cutting-wire, substantially as described.

6. The combination with clay-carrying mechanism adapted to support a bar of clay, of a cutting device consisting of endless belts and cutting-wires secured directly to and carried thereby, mechanism for moving said wires downward to cut the clay, and for moving said wires forward at an equal rate of speed with the moving clay, whereby the clay will be cut vertically, and tension devices acting upon the inner edges of said wire-carrying belts to hold them apart, substantially as described.

7. The combination with clay-carrying mechanism adapted to support a bar of clay, of a cutting device consisting of endless belts and cutting-wires secured directly to and carried thereby, mechanism for moving said wires downward to cut the clay, and for moving said wires forward at an equal rate of speed with the moving clay, whereby the clay will be cut vertically, and a tension device for keeping the wires taut, substantially as described.

8. The combination with devices for supporting a bar of clay, and sprocket-wheels 20 21, of belts 57 58 59 60, rods 61 62 carried by said belts, cutting-wires 56 connecting opposite rods 61 62, and sprocket-wheels carrying said cutting-wire belts, said latter sprocket-wheels being so placed that the cutting-wire belts will be caused to engage said sprocket-wheels 20 21, substantially as described.

9. The combination with devices for supporting a bar of clay, and sprocket-wheels 20 21, of belts 57 58 59 60, rods 61 62 carried by said belts, cutting-wires 56 connecting opposite rods 61 62, sprocket-wheels carrying said cutting-wire belts, said latter sprocket-wheels being so placed that the cutting-wire belts will be caused to engage said sprocket-wheels 20 21, and means for keeping said cutting-wires taut, substantially as described.

10. The combination with devices for supporting a bar of clay, and sprocket-wheels 20 21, of belts 57 58 59 60, rods 61 62 carried by said belts, cutting-wires 56 connecting opposite rods 61 62, sprocket-wheels carrying said cutting-wire belts, said latter sprocket-wheels being so placed that the cutting-wire belts will be caused to engage said sprocket-wheels 20 21, levers 71 72, devices pivotally supporting said levers, rollers 69 70 carried by said levers and adapted to bear against the inner edges of said belts 57 59, and a spring 74 connecting said levers, substantially as described.

11. The combination with devices adapted to support a bar of clay, and mechanism for severing said bar into bricks, of a turn-table, means for conducting the bricks to said turn-table, an inclined belt for delivering the bricks upon said turn-table, and means for driving said belt by the rotation of said turn-table, substantially as described.

12. The combination with devices adapted to support a bar of clay, and belts carrying wires to sever the clay into bricks, of tension devices acting upon the inner edges of said belts to hold them apart, substantially as described.

13. The combination with devices adapted to support a bar of clay, and mechanism for severing said bar into bricks, of a turn-table, means for conducting the bricks to said turn-table, the pivotally-supported plate 80 provided with an arm 84, the pulleys 76, 77, 78 and 79 mounted on said plate, the belt 75 on said pulleys, the weighted cord 82 attached to arm 84, and the guide-pulley 83 for said cord, substantially as described.

JOHN WINKELMEYER.

Witnesses:
NAT P. CLAYBAUGH,
JOSEPH CLAYBAUGH.